United States Patent Office 2,971,939
Patented Feb. 14, 1961

2,971,939
PROCESS FOR PREPARING HOMOGENEOUS CO-POLYMERS OF A VINYLIDENE MONOMER AND A MALEIC MONOMER AND PRODUCT THEREOF

Massimo Baer, Longmeadow, Mass., assignor to Monsanto Chemical Company, St. Louis, Mo., a corporation of Delaware No Drawing. Filed Jan. 30, 1959, Ser. No. 790,074

10 Claims. (Cl. 260—45.5)

This invention relates to substantially homogeneous copolymers of vinylidene compounds with either maleic anhydride or maleinimide, said copolymers containing less than 50 mol percent of the maleic anhydride or maleinimide. The invention also relates to a process for preparing such copolymers.

Maleic anhydride and maleinimide are valuable compounds in the field of high polymer chemistry. They do not polymerize easily per se to form homopolymers, but when mixed with various vinylidene compounds they copolymerize quite rapidly. There are two major drawbacks to the use of maleic anhydride or maleinimide in copolymerization reactions. First, they copolymerize so rapidly that special precautions have to be taken to prevent runaway reactions. Second, they generally polymerize in an approximately 1:1 molar ratio with the vinylidene monomer and it is nearly impossible to obtain a copolymer which contains more than 50 mol percent of the vinylidene compound.

One object of this invention is to provide substantially homogeneous copolymers of a vinylidene compound with maleic anhydride or maleinimide in which the combined vinylidene compound constitutes more than 50 mol percent of the copolymer.

Another object of this invention is to provide a mixture of (1) a homopolymer of a vinylidene compound and (2) a substantially homogeneous copolymer of the same vinylidene compound with maleic anhydride or maleinimide in which the combined vinylidene compound constitutes more than 50 mol percent of the copolymer.

Other objects and advantages of the invention will be apparent from the following detailed description thereof.

It has been discovered that substantially homogeneous copolymers of a vinylidene compound with maleic anhydride or maleinimide can be attained by a process which consist of: (1) heating a vinylidene compound to a temperature at which the vinylidene compound will polymerize, (2) stirring the polymerizing vinylidene compound, and (3) adding maleic anhydride or maleinimide to the stirred polymerizing vinylidene compound at a continuous and uniform rate, said addition of the maleic anhydride or maleinimide being made at a slower rate, in mols per unit time, than the rate, in mols per unit time, at which the vinylidene compound is polymerizing. Where a mixture of a homopolymer of the vinylidene compound and a substantially homogeneous copolymer of the same vinylidene compound with maleic anhydride or maleinimide is desired, the polymerization of the vinylidene compound is continued after the addition of the maleic anhydride or the maleinimide is terminated.

Example I

Mix together 100 parts of monomeric styrene and 0.025 part of di(tertiary butyl) peroxide and heat the mixture with agitation at 100° C. Under these conditions, the rate of polymerization is about 3% per hour. As soon as the polymerization of the styrene monomer is initiated, begin adding to the polymerizing material a solution of 7 parts of maleic anhydride in 28 parts of styrene. The addition should be made slowly, continuously and at a uniform rate over a period of about 11 hours while maintaining the temperature at about 100° C. Constant agitation should be provided throughout the addition. The product thus obtained in a viscous syrup containing about 40% copolymer dissolved in styrene monomer.

The copolymer is recovered by diluting the copolymer syrup with benzene and adding the dilute copolymer solution to cold methanol to precipitate the copolymer. It may also be obtained by other conventional methods such as drum drying. The copolymer is soluble in benzene, partially soluble in acetone and insoluble in boiling sodium hydroxide solution. It has a heat distortion temperature of about 120°C. and is easily molded by conventional means such as injection molding methods to yield clear hard molded objects. The maleic anhydride content of the copolymer is about 12%.

For some purposes, it is desirable to obtain a product containing a mixture of a styrene homopolymer and a styrene-maleic anhydride copolymer.

Example II

Mix together 100 parts of styrene and 0.025 part of di-(tertiary butyl) peroxide and heat the mixture to 100°C. with agitation. As soon as the polymerization of the styrene monomer is initiated, add 35 parts of a solution containing 7 parts of maleic anhydride and 28 parts of styrene monomer slowly, continuously and at a uniform rate over a period of about 11 hours while maintaining the temperature at about 100°C. Now place the material in a pressure-resistant container, seal the container and heat the material therein at a temperature gradually increasing from 110°C. to 190°C. The increase is temperature should be slow, taking place over a period of about 20 hours and the reaction should be continued for about 4 hours after reaching 190°C. The product is a mixture of about 60 parts by weight of a styrene homopolymer and 40 parts by weight of a homogeneous copolymer of styrene and maleic anhydride which contains about 88 weight percent combined styrene and 12 weight percent combined maleic anhydride. The mixed polymer product has a heat distortion temperature of about 100°C. as compared to about 87°C. for styrene homopolymer and 120°C. for the separated copolymer of Example I.

Example III

Mix together 100 parts of monomeric styrene and 0.025 part of di(tertiary butyl) peroxide and heat the mixture with agitation at 100°C. Immediately after the polymerization of the styrene is initiated, begin adding to the polymerizing material, with constant agitation, a solution of 10 parts of maleic anhydride in 40 parts of styrene monomer. The addition should be made slowly and continuously over a period of about 9 hours while maintaining the temperature at about 100°C. The product thus obtained is a viscous syrup containing about 37% copolymer.

The copolymer is recovered from an aliquot of the syrup by diluting the syrup with benezene and then adding the dilute solution to cold methanol to precipitate the copolymer. The copolymer is soluble in benzene, partially soluble in acetone and insoluble in boiling sodium hydroxide solution. The maleic anhydride content of the copolymer is about 16%. The copolymer has a heat distortion temperature of about 130° C. and is easily molded by conventional means to yield hard clear molded objects.

When maleinimide is substituted for the maleic anhydride of Example III, substantially the same results are obtained. The maleinimide copolymers will have higher heat distortion temperatures than the maleic anhydride copolymers and the maleinimide copolymers will be more easily cross-linked especially with formaldehyde.

*Example IV*

Place an aliquot of the syrup obtained in Example III in a pressure-resistant vessel. Seal the vessel and heat the syrup progressively at temperatures starting at 120° C. and rising to 190° C. over a period of about 24 hours. The product is a mixture of styrene homopolymer and the substantially homogeneous styrene-maleic anhydride copolymer described in Example III. The mixed polymer product can be molded easily by compression and injection molding techniques to provide molded objects having a heat distortion temperature of about 102° C.

*Example V*

Mix together 90 parts of styrene monomer, 0.25 part of ditertiary butyl peroxide and 400 parts of toluene and heat the mixture to 100° C. with agitation. As soon as the polymerization of the styrene monomer is initiated, add thereto a mixture of 10 parts maleic anhydride and 10 parts of styrene monomer dissolved in 20 parts of toluene. The addition of the maleic anhydride solution should be made continuously and uniformly over a period of 30 hours while continuously stirring the reaction mixture and maintaining it at 100° C. At the conclusion of the addition of the maleic anhydride solution, the reaction mixture contains (1) about 100 parts of copolymer containing therein about 90% styrene and about 10% maleic anhydride and (2) about 10 parts of unpolymerized styrene monomer. The styrene-maleic anhydride copolymer is recovered by vacuum drum drying.

The copolymers of this invention are copolymers of a maleic compound of the group consisting of maleic anhydride, maleinimide and mixtures thereof with a vinylidene compound copolymerizable therewith. Among the vinylidene compounds that may be used are vinyl esters of organic and inorganic acids such as vinyl acetate, vinyl stearate, vinyl chloride; vinylidene aromatic compounds such as styrene, vinyl naphthalene and the ring-alkyl and ring-halogen substituted derivatives thereof, e.g., vinyl toluene, vinyl xylene, 2,4-dimethylstyrene, chlorostyrene, 2,5-dichlorostyrene, 2-methyl-4-chlorostyrene, etc.; vinyl alkyl ethers, e.g., vinyl methyl ether, vinyl isobutyl ether, etc., vinylidene heterocyclic compounds such as vinyl pyridine, etc. and mixture of two or more of said vinylidene compounds. The copolymers of the invention may contain about 60–99 mol percent of the vinylidene compound and, correspondingly, about 40–1 mol percent of the maleic compound. In a preferred embodiment of the invention, the copolymer will contain about 75–95 mol percent of the vinylidene compound and, correspondingly, 25–5 mol percent of the maleic compound.

To prepare the copolymers of the invention, the vinylidene compound is charged to a stirred reaction vessel and heated, preferably in presence of a peroxy polymerization catalyst, to initiate the polymerization of the vinylidene compound. The maleic compound is then added slowly, continuously and at a uniform rate to the well stirred vinylidene compound. The addition of the maleic compound to the polymerizing vinylidene monomer is made at a slower rate, in mols per unit time, than the rate, in mols per unit time, at which the vinylidene compound is polymerizing.

As the process is operated, the maleic compound is consumed substantially as rapidly as it is added to the polymerizing vinylidene compound. As a first approximation, the composition of the copolymer formed in the reaction is determined by the ratio of the rate of homopolymerization of the vinylidene compound under the polymerization conditions employed to the rate of addition of the maleic compound to the polymerizing vinylidene compound. If the polymerization conditions such as temperature, catalyst concentration, etc., are selected so that the vinylidene compound will homopolymerize at a rate of 2 mol percent/hour and the maleic compound is added to the polymerizing vinylidene compound at a rate of 1 mol percent/hour, the copolymer formed will contain approximately 33 mol percent of the maleic compound. Similarly, if the polymerization conditions are selected so that the vinylidene compound will homopolymerize at a rate of 1 mol percent/hour and the maleic compound is added to the polymerizing vinylidene compound at a rate of 0.1 mol percent/hour, the copolymer formed will contain approximately 9 mol percent of the maleic compound. The approximate mol percent of the maleic compound contained in the copolymer is expressed by the formula:

$$\text{Percent maleic compound in copolymer} = \frac{r_1}{r_1 + r_2} \times 100$$

where $r_1$ is the rate, in mols per hour, at which the maleic compound is added to the polymerizing vinylidene compound and $r_2$ is the rate, in mols per hour, at which the vinylidene compound will homopolymerize under the polymerization conditions employed. In actual practice, it is observed that the value calculated from the above formula is a limiting value and in virtually all cases the percent of the maleic compound found in the copolymer will be somewhat lower than the calculated value.

As noted above, the essential novelty of the invention resides in adding the maleic compound to the polymerizing vinylidene compound at a constant and uniform rate, said rate of addition, in mols per unit time, being slower than the rate of polymerization of the vinylidene compound. Thus, the absolute rate of polymerization of the vinylidene compound and rate of addition of the maleic compound are relatively unimportant. For reasons of convenience and economy, however, it is preferred to run the polymerization under conditions such that the vinylidene compound will polymerize at a rate of about 0.2–5.0 mol percent/hour. To attain such rates, the polymerization will usually be run at a temperature in the range of 60–120° C. in the presence of a free radical generating polymerization initiator such as benzoyl peroxide, ditertiarylbutyl peroxide, tertiarybutyl hydroperoxide, lauroyl peroxide, tertiarybutyl perbenzoate, azoisobutyronitrile, etc. The quantity of catalyst employed will usually be 0.01–5.0 parts per 100 parts of vinylidene monomer. By way of specific example, styrene monomer containing 0.025% ditertiarybutyl peroxide will polymerize at a rate of about 3 mol percent/hour at 100° C.

In carrying out the process, the addition of the maleic compound will be terminated before all of the vinylidene compound in the reaction vessel is polymerized. Thereafter, to obtain the copolymer in a form substantially free of homopolymer of the vinylidene compound, the polymerization will be stopped. However, if it is desired to prepare a mixture of a homopolymer of the vinylidene compound and a copolymer of the vinylidene compound with the maleic compound, the polymerization of the vinylidene compound will be continued after the addition of the maleic compound is terminated, cf. Examples II and IV.

The polymerization may be carried out en masse or in solution in an inert solvent such as an aromatic hydrocarbon, e.g., benzene, toluene or xylene, an aliphatic hydrocarbon, e.g., hexane, octane, etc., a chlorinated hydrocarbon such as a chlorobenzene, ethylene dichloride, carbon tetrachloride, etc., or the like. As the maleic compound employed in the process is a solid, it is usually convenient to dissolve it in either a small quantity of the vinylidene monomer or a solvent before adding the maleic compound to the polymerizing vinylidene compound.

The process for preparing the copolymers of the invention can readily be run on a continuous basis. In this embodiment of the invention, the vinylidene compound, together with a solvent and a polymerization initiator (if either is desired), is heated in a stirred reaction vessel to initiate the polymerization of the vinylidene compound. Thereafter, the maleic compound is slowly and continuously added to the stirred polymerizing vinylidene compound at a rate, in mols per unit time, that is slower than the rate at which the vinylidene compound is polymerizing. When the concentration of the copolymer in the polymerization vessel has reached a convenient level, a slow steady stream of the liquid reaction mixture is withdrawn from the polymerization vessel. After the withdrawal of the copolymer from the polymerization vessel is started, additional vinylidene compound is added to the polymerization vessel together with the maleic compound, the mol ratio of the added vinylidene compound and maleic compound being substantially identical with the mol ratio in which the vinylidene compound and the maleic compound are combined in the withdrawn copolymer. The rate of withdrawal of the copolymer solution from the polymerization vessel should be substantially identical with the rate at which the maleic compound and vinylidene compound are being added to the polymerization vessel.

The copolymers of this invention are harder and have higher heat distortion temperatures than the homopolymers of the respective vinylidene compounds included therein. They are readily processed by conventional procedures such as compression molding, injection molding, extrusion, etc. Mixtures of vinylidene compound homopolymers and copolymers of the same vinylidene compound with the maleic compound have heat distortion temperatures intermediate between that of the vinylidene compound homopolymer and the copolymer of the vinylidene compound and maleic compound. These mixed polymers are easily fabricated to produce hard moldings and extruded shapes.

The above descriptions and particularly the examples are set forth for purposes of illustration only. Many other variations and modifications thereof will be apparent to those skilled in the art and can be made without departing from the spirit and scope of the invention herein described.

This application is a continuation in part of my earlier application S.N. 463,621, filed October 20, 1954, now abandoned.

What is claimed is:

1. A process for preparing a substantially homogeneous copolymer containing at least 60 mol percent of a vinylidene compound and not more than 40 mol percent of a maleic compound which consists essentially of the steps: (1) polymerizing at least 60 molar proportions of the vinylidene compound with agitation and (2) adding not more than 40 molar proportions of the maleic compound to the polymerizing vinylidene compound continuously and at a uniform rate throughout the polymerization of the vinylidene compound, the addition of the maleic compound being started after polymerization of the vinylidene compound is initiated; said vinylidene compound being selected from the group consisting of a vinyl ester of a monobasic alkanoic acid containing 1–18 carbon atoms, vinyl chloride, a vinylidene aromatic hydrocarbon, a ring-alkyl substituted vinylidene aromatic hydrocarbon, a ring-halogen substituted vinylidene aromatic hydrocarbon, a ring-alkyl, ring-halogen substituted vinylidene aromatic hydrocarbon, vinyl pyridine, a vinyl alkyl ether, and mixtures thereof; said maleic compound being selected from the group consisting of maleic anhydride, maleinimide and mixtures thereof.

2. The process of claim 1 in which the vinylidene compound is styrene and the maleic compound is maleic anhydride.

3. A process for preparing a substantially homogeneous copolymer containing at least 75 mol percent of a vinylidene compound and not more than 25 mol percent of a maleic compound which consists essentially of the steps: (1) polymerizing at least 75 molar proportions of the vinylidene compound with agitation and (2) adding not more than 25 molar proportions of the maleic compound to the polymerizing vinylidene compound continuously and at a uniform rate throughout the polymerization of the vinylidene compound, the addition of the maleic compound being started after polymerization of the vinylidene compound is initiated; said vinylidene compound being selected from the group consisting of a vinyl ester of a monobasic alkanoic acid containing 1–18 carbon atoms, vinyl chloride, a vinylidene aromatic hydrocarbon, a ring-alkyl substituted vinylidene aromatic hydrocarbon, a ring-halogen substituted vinylidene aromatic hydrocarbon, a ring-alkyl, ring-halogen substituted vinylidene aromatic hydrocarbon, vinyl pyridine, a vinyl alkyl ether, and mixtures thereof; said maleic compound being selected from the group consisting of maleic anhydride, maleinimide and mixtures thereof.

4. A process for preparing a substantially homogeneous copolymer containing at least 75 mol percent of styrene and not more than 25 mol percent of maleic anhydride which consists essentially of the steps: (1) heating styrene monomer containing a catalytic quantity of a peroxy catalyst to a temperature at which the styrene monomer will polymerize at a rate of at least about 3 weight percent per hour and (2) adding maleic anhydride to the polymerizing styrene monomer continuously and uniformly at a rate not in excess of about 1 weight percent per hour.

5. A process for preparing a mixture of a homopolymer of a vinylidene compound and a substantially homogeneous copolymer containing at least 60 mol percent of a vinylidene compound and not more than 40 mol percent of a maleic compound which consists essentially of the steps: (1) polymerizing at least 60 molar proportions of the vinylidene compound with agitation, (2) throughout step (1) adding not more than 40 molar proportions of the maleic compound to the polymerizing vinylidene compound continuously and at a uniform rate throughout the polymerization of the vinylidene compound, the addition of the maleic compound being started after polymerization of the vinylidene compound is initiated, and (3) after terminating the addition of the maleic compound continuing the polymerization reaction until substantially all of the vinylidene compound has polymerized; said vinylidene compound being selected from the group consisting of a vinyl ester of a monobasic alkanoic acid containing 1–18 carbon atoms, vinyl chloride, a vinylidene aromatic hydrocarbon, a ring-alkyl substituted vinylidene aromatic hydrocarbon, a ring-halogen substituted vinylidene aromatic hydrocarbon, a ring-alkyl, ring-halogen substituted vinylidene aromatic hydrocarbon, vinyl pyridine, a vinyl alkyl ether, and mixtures thereof; said maleic compound being selected from the group consisting of maleic anhydride, maleinimide and mixtures thereof.

6. A process for preparing a mixture of a styrene homopolymer and a substantially homogeneous copolymer containing at least 75 mol percent of styrene and not more than 25 mol percent of maleic anhydride which consists essentially of the steps: (1) heating styrene monomer containing a catalytic quantity of a peroxy catalyst to a temperature at which the styrene monomer will polymerize at a rate of at least about 3 weight percent per hour, (2) adding maleic anhydride to the polymerizing styrene monomer continuously and uniformly at a rate not in excess of about 1 weight percent per hour and (3) after terminating the addition of the maleic anhydride continuing the polymerization reaction until substantially all of the styrene monomer has polymerized.

7. A copolymer prepared by the method of claim 1.
8. A copolymer prepared by the method of claim 4.
9. A polymer composition prepared by the method of claim 5.
10. A polymer composition prepared by the method of claim 6.

References Cited in the file of this patent

UNITED STATES PATENTS

| | | |
|---|---|---|
| 2,554,959 | Rowland | May 29, 1951 |
| 2,866,771 | Sellers | Dec. 30, 1958 |